United States Patent [19]

Skipper et al.

[11] Patent Number: 4,743,644

[45] Date of Patent: May 10, 1988

[54] STABILIZED-ALUMINA FILLED THERMOPLASTICS

[75] Inventors: Richard S. Skipper, Cirencester; Richard J. Penneck, Lechlade, both of England

[73] Assignee: Raychem Limited, United Kingdom

[21] Appl. No.: 30,282

[22] Filed: Mar. 23, 1987

Related U.S. Application Data

[63] Continuation of Ser. No. 794,930, Nov. 4, 1985, abandoned, which is a continuation-in-part of Ser. No. 701,457, Feb. 14, 1985, abandoned, which is a continuation of Ser. No. 600,194, Apr. 13, 1984, abandoned, which is a continuation of Ser. No. 405,220, May 5, 1982, abandoned, which is a continuation of Ser. No. 202,698, Oct. 31, 1980, abandoned, said Ser. No. 794,930, is a continuation-in-part of Ser. No. 714,047, Mar. 19, 1985, abandoned, which is a continuation of Ser. No. 600,193, Apr. 13, 1984, abandoned, which is a continuation of Ser. No. 405,227, Aug. 5, 1982, abandoned, which is a continuation of Ser. No. 202,700, Oct. 31, 1980, abandoned.

[30] Foreign Application Priority Data

Nov. 3, 1979 [GB] United Kingdom ............... 7938155
Nov. 3, 1979 [GB] United Kingdom ............... 7938148
Jul. 12, 1980 [GB] United Kingdom ............... 8022866

[51] Int. Cl.$^4$ .................................................. C08K 3/22
[52] U.S. Cl. ..................................... 524/437; 106/303; 174/110 SR; 174/110 PM; 252/602; 252/609; 524/177; 524/188; 524/409; 524/410; 524/411
[58] Field of Search ............... 524/409, 411, 410, 437, 524/188, 177; 106/308 F, 303, 308 N, 308 Q; 174/110 SR, 110 PM; 252/602, 609

[56] References Cited

U.S. PATENT DOCUMENTS

| | | |
|---|---|---|
| Re. 31,214 | 4/1983 | Petrow et al. . |
| 2,913,428 | 11/1959 | Schoepfle et al. . |
| 2,924,532 | 2/1960 | Dereich . |
| 2,997,526 | 8/1961 | Kessel et al. . |
| 2,997,527 | 8/1961 | Kessel et al. . |
| 2,997,528 | 8/1961 | Kessel et al. . |
| 3,031,425 | 4/1962 | Schoepfle et al. . |
| 3,080,406 | 3/1963 | Marks et al. ............. 260/446 |
| 3,239,482 | 3/1966 | Rapp . |
| 3,353,910 | 11/1967 | Cornelius et al. ............. 423/626 |
| 3,446,585 | 5/1969 | Tanabe ............. 423/629 |
| 3,459,502 | 8/1969 | Nordstrand ............. 423/629 |
| 3,468,844 | 9/1969 | Merriam et al. . |
| 3,563,939 | 2/1971 | Stevens, Jr. et al. . |
| 3,657,179 | 4/1972 | Yates ............. 260/30.8 |
| 3,676,476 | 7/1972 | Randolph . |
| 3,718,584 | 2/1973 | Beste et al. . |
| 3,741,893 | 6/1973 | Mascioli et al. . |
| 3,752,837 | 8/1973 | Okato et al. . |
| 3,763,202 | 10/1973 | Cumbo et al. ............. 524/411 |
| 3,832,326 | 8/1974 | North et al. ............. 524/437 |
| 3,873,451 | 3/1975 | Cumbe et al. . |
| 3,926,873 | 12/1975 | Aishima et al. ............. 260/18 R |
| 3,960,989 | 6/1976 | Petrow et al. . |
| 3,962,177 | 8/1976 | Dickens, Jr. ............. 524/411 |
| 3,994,825 | 11/1976 | Crompton et al. . |
| 4,010,104 | 3/1977 | Randlmann et al. . |
| 4,017,418 | 4/1977 | Crompton et al. . |
| 4,018,809 | 4/1977 | Randlmann et al. . |
| 4,048,135 | 9/1977 | Wurmb et al. ............. 524/411 |
| 4,059,540 | 11/1977 | Crompton et al. . |
| 4,062,693 | 12/1977 | Berger ............. 106/308 |
| 4,075,032 | 2/1978 | Thomas ............. 106/303 |
| 4,100,074 | 7/1978 | Abe et al. . |
| 4,100,075 | 11/1978 | Ashman et al. ............. 524/412 |
| 4,100,076 | 7/1978 | Ashman et al. . |
| 4,100,077 | 7/1978 | Burt et al. . |
| 4,100,089 | 7/1978 | Cammack, II et al. ............. 144/137 |
| 4,125,509 | 11/1978 | Vostovich ............. 260/336 |
| 4,147,690 | 4/1979 | Rich ............. 524/437 |
| 4,169,104 | 9/1979 | Burt et al. . |
| 4,193,908 | 3/1980 | Hsieh et al. ............. 106/309 |
| 4,277,570 | 7/1981 | Michel ............. 524/412 |
| 4,283,316 | 8/1981 | Bonsignore ............. 106/308 |
| 4,362,658 | 12/1982 | Contin . |
| 4,377,506 | 3/1983 | Sprague . |

FOREIGN PATENT DOCUMENTS

| | | |
|---|---|---|
| 76110683 | 9/1976 | Japan . |
| 7733519 | 3/1977 | Japan . |
| 52-39999 | 3/1977 | Japan . |
| 4748639 | 4/1978 | Japan . |
| 081978 | 7/1978 | Japan . |
| 139647 | 10/1979 | Japan . |
| 8027329 | 2/1980 | Japan . |
| 56-26954 | 3/1981 | Japan . |
| 573471 | 11/1945 | United Kingdom . |
| 1300595 | 12/1972 | United Kingdom . |
| 1337951 | 11/1973 | United Kingdom . |
| 1373774 | 11/1974 | United Kingdom . |
| 1496088 | 12/1977 | United Kingdom . |
| 1519685 | 8/1978 | United Kingdom . |
| 2028833 | 3/1980 | United Kingdom . |

OTHER PUBLICATIONS

Grdenic et al.: J. Inorganic Nuclear Chemistry (1968), vol. 30, pp. 1751–1755.

Kunstoffe–(German Plastics), vol. 67, No. 1, pp. 34–38 (1977).

Antimony–Halogen Synergistic Reactions in Fire Retardants, James J. Pitts, 6/71.

Uranium(IV) Acetate and Its Double Acetates with (Continued on next page.)

Primary Examiner—Veronica P. Hoke
Attorney, Agent, or Firm—Yuan Chao; Edith A. Rice; Herbert G. Burkard

[57] ABSTRACT

A water stabilizer polymeric composition incorporating a hydrated alumina filler, which is characterized by the presence of an effective amount of an antimony V compound. The compositions have a reduced tendency to absorb water and specific compositions find applicaiton as electrical insulation and in the production of dimensionally recoverable article.

36 Claims, No Drawings

OTHER PUBLICATIONS

Magnesium, Iron and Zinc, Grdenic & Korpar-Colig, 12/77, pp. 1751-1755.
Nyacol Inc., Technical Bulletin, Nvacol Colloidal Antimony Oxide, 1/79, pp. 1-52.
Nyacol Inc. Technical Bulletin, Nyacol Colloidal Antimony Oxide, 10/79, pp. 1-50 with 8 pages attached.
Encyclopedia of Chemical Technology, vol. 3, Antiobiotics to Bleaching Agents, 1978, pp. 107-109.
Handbook of Preparative Inorganic Chemistry, vol. 1, 1963, pp. 614-617.
Aluminium Hydroxide-Flame Protective Agent and Filler for Plastics, translated from Kunststoffe, 1977.

STABILIZED-ALUMINA FILLED THERMOPLASTICS

CROSS REFERENCE TO RELATED APPLICATIONS

This application is a continuation of application Ser. No 794,030, filed Nov. 4, 1985, now abandoned, which in turn is a continuation-in-part of application Ser. No. 701,457, filed Feb. 14, 1985, now abandoned, which in turn is a continuation of application Ser. No. 600,194 filed Apr. 13, 1984, now abandoned, which in turn is a continuation of application Ser. No. 405,220, filed Aug. 5, 1982, now abandoned, which in turn is a continuation of application Ser. No. 202,698, filed Oct. 31, 1980, now abandoned; application Ser. No. 794,930 further being a continuation-in-part of application Ser. No. 714,047, filed Mar. 19, 1985, now abandoned, which in turn is a continuation of application Ser. No. 600,193, filed Apr. 13, 1984, now abandoned, which in turn is a continuation of application Ser. No. 405,227, filed Aug. 5, 1982, now abandoned, which in turn is a continuation of application Ser. No. 202,700, filed Oct. 31, 1980, now abandoned, the disclosures of which are herein incorporated by reference.

BACKGROUND OF THE INVENTION

Improvements in or relating to Polymeric Compositions

The present invention concerns polymeric compositions and more specifically such compositions which contain a particulate filler or fillers.

Polymeric compositions incorporating hydrated alumina fillers, especially of the formula $Al_2O_3.xH_2O$ wherein x is 0.5 to 3, e.g. to impart flame retardent properties or to enhance the anti-tracking properties in electrical applications, frequently exhibit a tend a tendency to absorb water particularly when the composition comprises a polar polymer.

This tendency to absorb water is often directly or indirectly attributable to the particulate filler, i.e. to the hygroscopic nature of the filler per se or of the filler after incorporation into the polymeric composition. In the latter respect, it has been found that hydrated aluminas when incorporated into certain polymeric compositions can undergo, at least to a limited extent, a chemical or physical transformation yielding a chemical species substantially more hygroscopic than the incorporated filler per se.

The presence of such chemical species in a filled polymeric system may result in a very high water pick-up exposed to wet environments, especially hot wet environments.

The tendency of polymeric compositions to absorb water may render the use thereof in certain applications unsuitable, particularly in electrical insulation applications and especially flame retarded systems wherein reliance is placed on hydrated alumina fillers to provide flame retardancy.

The present invention is concerned with reducing or eliminating the tendency of hydrated alumina filled polymeric compositions to absorb water, hereinafter referred to as "water stabilization" and the expression "water stabilizer" is to be construed accordingly.

A first aspect of the present invention provides a water stabilized polymeric composition incorporating a hydrated alumina filler which is characterized by the presence of an effective amount of an antimony V compound.

A second aspect of the present invention provides water stabilized hydrated alumina characterized in that it includes an effective amount of an antimony V compound.

A third aspect of the present invention provides electrical equipment, for example a wire or cable, or a high voltage insulator, incorporating as electrical insulation a polymeric composition in accordance with the first aspect of the invention.

A fourth aspect of the present invention provides a water stabilized dimensionally recoverable, and especially heat-recoverable, article comprising a polymeric composition in accordance with the first aspect of the invention, preferably in cross-linked form.

A fifth aspect of the present invention provides a water stabilized adhesive composition or sealant composition comprising a polymeric composition in accordance with the first aspect of the present invention.

A sixth aspect of the present invention provides water stabilized panels and cladding especially reinforced e.g. glass reinforced, panels and cladding, for use e.g. in the construction industry and passenger transit vehicle industry comprising a polymeric composition in accordance with the first aspect of the invention.

The particulate fillers that may be employed in the compositions of the present invention are those which have a tendency to absorb water at least after incorporation into the composition. Particularly important classes of fillers include hydrated aluminas used as inorganic flame retardants and electrical anti-tracking agents, especially halogen-free such fillers. Preferred fillers are hydrated aluminas of the formula $Al_2O_3.xH_2O$ wherein x is 0.5 to 3, for example alumina monohydrates e.g. $Al_2O_3.xH_2O$, but especially alumina trihydrate $Al_2O_3.xH_2O$. In this specification the term hydrated alumina is also intended to include materials which are known as aluminum hydroxides e.g. $Al(OH)_3$ and aluminium oxyhydroxides e.g. $AlO.OH$. Other suitable hydrated alumina fillers include ammonium and sodium dawsonite. Mixtures of hydrated alumina fillers may be used if desired.

The hydrated alumina filler used is preferably selected from those having a surface area of at least 0.1 $M^2/g$, up to 300 $mm^2/g$ and most preferably having a surface area of from 0.1 $m^2/g$ to 100 $m^2/g$, particularly 2 to 40 $m^2/g$, and especially 4 to 16 $m^2/g$, as measured by the B.E.T. method. Outstanding improvements in the electrical properties of filled polymer compositions containing high surface area alumina trihydrate fillers may be achieved using the present invention.

The amount of filler incorporated in the compositions of the invention will naturally depend inter alia on the nature thereof although in general, amounts in the range 5 to 80%, more preferably 20 to 70%, especially 30 to 70%, e.g. 40 to 70% based on the weight of the composition, are preferred.

Whilst we believe that insolubilization of residual sodium in the filler plays a role in water stabilization by antimony V compounds, the complete mechanism of water stabilization is not fully understood and will vary depending on the nature of the insolubilizing agent. It is conjectured that in addition to forming a water insoluble compound with any available sodium present, the antimony V compound may also function as a water stabilizer by forming a water barrier around the filler particles thereby inhibiting water access to any hydroscopic moieties in the hydrated alumina even when the antimony V compound is not pre-coated onto the filler. Furthermore, and depending on the nature of the filler and antimony V compound, we believe that such water barrier may be the result of complex formulation between the antimony V compound and the surface of the filler particles.

Although not essential, it is preferred that the level of sodium impurity in the hydrated alumina should be reduced to a minimum. This may be achieved by pre-treatment, for example, washing with water or an aqueous medium particularly aqueous inorganic or organic acids, e.g. to a total sodium level less than 1000 ppm, more preferably less than 600 ppm of sodium measured as $Na_2O$, based on the weight of the hydrated alumina.

Reduction of the sodium impurity level may also be achieved by pre-treatment of the filler with a sodium complexing or chelating agent such as particularly zinc or magnesium uranyl acetate, but also uranic acid, molybdic acid, orthophosphoric acid, hypophosphorous acid, dodecamolybdophosphoric acid and polydentate ligands such as polyketonates. Such treatment is normally followed by washing of the filler to remove any water soluble compounds thus formed.

Many conventional polymer processing methods involve milling, internal mixing e.g. in a Banbury mixer, or other treatment stages likely to cause some break-up of the filler particules thereby exposing sodium ions previously trapped within the crystal lattice. It will be appreciated therefore that for many purposes merely reducing the soluble sodium content of the filler prior to blending with the polymer is not sufficient to water stabilize the filled polymer system.

The antimony V compound may be incorporated by distribution thereof throughout the composition or alternatively the particulate filler may be reacted by coating therewith as appropriate.

However, it has been found that greatly improved results are obtained if the hydrated alumina, an effective amount of the antimony V compound and the polymer, are processed together, for example on a mill or in an internal mixer, for an extended period of time. such processing is preferably carried out for at least 5 minutes, and preferably from 10 to 60 minutes. Alternatively, the hydrated alumina may be treated with the antimony V compound prior to blending with the polymer. Suitable antimony V compounds include, for example, the hydrated forms of antimony V oxide, especially the monohydrates $Sb_2O_5.H_2O$, antimony alkoxides, for example antimony V pentamethoxide, and antimony pentahalides, for example antimony pentachloride. The treatment step may require to be followed by a washing treatment with an aqueous or organic solvent depending upon the antimony V compound used but at least in the case of the hydrated antimony V oxides this is not essential.

Whatever the mechanism of the water stabilization by the antimony V compound, it has been found in practice that further improved results may be obtained when the hydrated alumina and/or the antimony V compound is coated with a reagent and preferably one which will chemically react or physically bond with the surface of the hydrated alumina and/or antimony V compound.

As examples of reagents which may be employed to coat the surface of the filler and/or the antimony V compound there may be mentioned acids, both organic and inorganic, and reactive functional acid derivatives, e.g. esters, acid halides and anhydrides, and coupling agents such as titanates and silanes, and complexing or chelating agents including polydentate ligands such as B-polyketonates and Schiff base(imine) derivatives thereof.

Examples of organic acids include mono- or polybasic substituted or unsubstituted carboxylic, thiocarboxylic or sulphonic acids such as monobasic $C_2$-$C_{20}$ acids, e.g. acrylic, acetic, n-propionic, n-butanoic, n-hexanoic, n-octanoic, lauric and stearic acids, aromatic acids, e.g. benzoic acid and polybasic $C_2$-$C_{20}$ acids, e.g. oxalic, maleic, fumaric, malonic, succinic and itaconic acids and derivates such as the anhydrides and monesters, especially mono-alkyl or a-alkenyl esters, thereof.

Examples of substituted mono- or polybasic carboxylic or thiocarboxylic acids are amino acids, e.g. glycine, alanine and phenylalanine and hydroxy, particularly a-hydroxy, acids, such as lactic acid, salicylic acid, tannic acid and citric acid, especially citric acid.

Examples of inorganic acids include dilute mineral acids such as hydrochloric acid as well as phosphoric acid, molybdic acid, hypophosphorous acid and telluric acid.

Examples of coupling agents include organo-silicon and titanium derivatives such as silanes and titanates.

Examples of appropriate silanes are disclosed in UK Patent No. 1,284,082 and "Silane coupling Agents", Additives for Plastics, Vol. 1 pp 123-167, Academic Press 1978, and appropriate titanium compounds in S. J. Monte and G. Sugerman, J. Elastomers and Plastics, Volume 8 (1976) pages 30-49 and in Bulletins KR 0376-4 and 0278-7"Ken React Titanate Coupling Agents for Filled Polymers" published by Kenrich Petro Chem Inc., the disclosures of which are incorporated herein by reference.

Suitable polyketonates and Schiff base derivates include those derived from polyketones of formulae

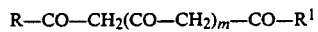

Where R and $R^1$ are the same or different and can be alkyl, alkenyl, aryl or alkaryl groups and m - 0 or an integer.

Examples of such compounds include acetyl acetone, allyl aceto-acetonate, di-acetyl acetone, benzoly acetyl acetone, dibenzoly acetone, and benzoyl allyl acetoacetonate. A suitable Schiff base derivative is:

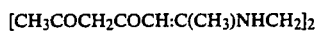

Furthermore, by appropriate choice of pre-coating reagent, the treatment may additionally serve to reinforce the composition, for example by employing unsaturated reagents, particularly unsaturated carboxylic or thiocarboxylic acids or functional derivatives thereof, such as acrylic, methacrylic, vinylacetic, allylacetic, fumaric, maleic or itaxonic acids, or unsaturated esters, e.g. allyl esters of polybasic, particuarly dibasic, acids, e.g. the mono-allyl ester of malonic, maleic or succinic acids, whereby the unsaturated function enables grafting of the reagents to the polymeric matrix of the composition. Alternatively, reinforcement may be imparted by use of coupling agents.

Under certain circumstances, various desirable properties may be optimized by the use of a plurality of precoating reagents. Thus a combination of acrylic and stearic acids permits a satisfactory balance of physical and water stabilization properties.

The amount of pre-coating reagent(s) employed preferably lies in the range 0.1 to 15 weight per cent, more preferably 1 to 10 weight per cent based on the weight of the filler.

In some cases processing aids such as stearic acid and stearates, e.g. calcium stearate, and aluminium soaps such as aluminium di-isopropoxy diversatate or polyoxo carboxylates, such as polyoxo aluminium stearate, may be particularly useful.

Examples of appropriate aluminum soaps and polyoxo aluminium carboxylates are given in U.K. Patent No. 825,878, the disclosures of which are incorporated herein by reference.

Of the possible antimony V compounds, including antimony V complexes, which may be employed in the composition of the present invention particuarly preferred are the hydrated forms of antimony V oxide, especially the monohydrate i.e. $Sb_2O_5.H_2O$, and precursors thereof. Such precursors include compounds which during processing or by other chemical or physical treatment may be converted into a hyrated antimony V oxide. However good results may also be obtained using antimony V alkoxides, for example, antimony V pentamethoxide.

The antimony V compound is present in an amount effective to improve the water stability of the composition, said amount being preferably in the range 0.1 to 60 weight per cent based on the composition, more preferably 0.1 to 25 weight per cent, although for water stabilization purposes only, it has been found that amounts in the range 0.1 to 10 weight per cent e.g. 0.5 to 10 weight per cent are quite satisfactory. However, it has also surprisingly been found that whilst lower amounts have no substantial positive effect on flame retardancy of the composition and indeed, in some instances a depression of flame retardance is observed, in higher amounts, e.g. above 5 weight per cent, preferably from 10 to 25 weight per cent, especially 10 to 15 weight per cent based on the composition, a substantial increase in flame retardance is observed at elevated temperatures, i.e. as measured by the British Ministry of Defense specification NES 715 (based on ASTM-D-2863) whilst still providing satisfactory water stabilization.

Polymeric compositions wherein the water stabilizers have been found to exhibit notable efficacy in reducing water absorption include non-cross-linked and cross-linked thermoplastic or elastomeric substituted or unsubstituted polyalkenes or alkene copolymers, such as alkene/alkene copolymers, vinyl ester homo- or copolymers and (meth)acrylate homo- or copolymers.

The term "copolymer" as used in herein is employed in a broad sense to mean any polymer containing at least 2 different monomeric species and includes terpolymers and the like.

Unsubstituted polyalkenes and alkene copolymers of interest include polyethylenes and alkene/alkene copolymers such as ethylene/alkene copolymers, especiality those disclosed in UK Patent Application No. 2019412A and Canadian Patent No. 873,828 the disclosures of which are incorporated herein by reference and elastomers such as EPDM (ethylene/propylene/diene monomer) and SBR (styrene/butadiene rubber).

The vinyl ester homo- or copolymers of interest are those derived from vinyl ester monomers of formula I

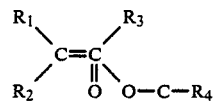

wherein $R_1$, $R_2$, and $R_3$ are each, independently hydrogen or a substituted or unsubstituted hydrocarbon group having up to 20 carbon atoms, e.g. $C_1$-$C_8$ alkyl, and $R_4$ is a substituted or unsubstituted hydrocarbon group having up to 20 carbon atoms, which may optionally include one or more hetero atoms, especially where $R_1$, $R_2$, and $R_3$ are each independently hydrogen or $C_1$-$C_4$ alkyl, and one of $R_1$, $R_2$, and $R_3$ may also signify phenyl or benzyl, and $R_4$ is an alkyl, alkenyl, alkoxyalkyl or alkoxy-alkenyl, aryl or aralkyl group having up to 20 carbon atoms e.g. phenyl, naphthyl or benzyl, or $C_1$-$C_4$, alkyl- or alkoxyphenyl or benzyl, and particuarly when $R_4$ is $C_1$-$C_{15}$ alkyl, phenyl or benzyl.

Examples of specific vinyl ester monomers useful in the polymers of interest are vinyl acetate, vinyl propionate, vinyl hexanoate, vinyl octanoate, vinyl versatate, vinyl stearate, vinyl laurate, vinyl methoxy-acetate, vinyl trimethylacetate, vinyl isobutyrate, vinyl tert, pentoate, vinyl lactate, vinyl caprylate, vinyl pelargonate, vinyl myristate, vinyl oleate, vinyl linoleate, vinyl benzoate, vinyl ($C_1$-$C_4$) alkoxy benzoate, vinyl octylphthalate, vinyl B-phenyl butyrate, vinyl B-naphthoate, vinyl ethyl phthlate and vinyl phenyl acetate.

Vinyl ester copolymers of interest include mixed vinyl ester copolymers e.g. copolymers of vinyl acetate with higher vinyl esters, e.g. vinyl laurate as well as copolymers with comonomers other than vinyl esters. Other such comonomers include unsaturated hydrocarbons such as olefins e.g., ethylene, propylene, particularly $C_4$-$C_{12}$ a-unsaturated olefins, e.g. but- 1 ene, hex-1-ene and oct-1 -ene, styrene and unsubstituted or substituted esters, e.g. $C_1$-$C_{12}$ (meth)acrylates and other vinyl monomers, e.g. vinyl chloride.

When copolymers with comonomers other than vinyl esters are employed, then preferably the vinyl ester monomer(s) is present in at least 5 mole %, preferably at least 10 mole %, e.g. 20–95 mole %, more preferably at least 30 mole %, e.g. 40–95 mole %.

The (meth)acrylate homo- or copolymers of interest are those derived from (meth)acrylate monomers of formula II,

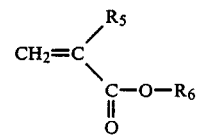

wherein
$R_5$ is H or $CH_3$
and $R_6$ is a substituted or unsubstituted hydrocarbon group having up to 20 carbon atoms, which may optionally include one or more hetero atoms, preferably an alkyl, alkenyl, alkoxyalkyl or alkoxyalkenyl aryl or aralkyl group having up to 20 carbon atoms, e.g. phenyl, naphthyl or benzyl, and particuarly $C_1$-$C_{15}$ alkyl, phenyl or benzyl.

Preferred homo polymers include polyethyl acrylate, polybutyl acrylate. Particularly preferred (meth)acrylate copolymers are ethylene/ethyl acrylate (18 weight per cent), ethylene/ethyl methacrylate (20 weight per cent) and terpolymers of ethylene, methyl acrylate and a cure-site carboxyl-containing monomer such as the terpolymer commercially available from DuPont under the trade name "Vamac" and analogous polymers described in UK Patent No. 1,548,232 the disclosure of which is incorporated herein by reference. Other copolymers suitable for use in the present invention include those derived from any of the above mentioned monomers and a cure site monomer such as 2-chloroethyl vinyl ether or 2-chloroethyl acrylate.

Other polymers of interest which may be employed in the compositions of the invention include epoxy resins especially cycloaliphatic epoxy resins such as those employed for high voltage insulation applications, e.g. Araldite CY175 and Bakelite FRC 4221, especially when cured with cycloaliphatic acid anhydrides e.g. hexa-hydro phthallic anhydridie, unsaturated polyesters especially glass filled polyesters, and polyamides especially aliphatic polyamides such as nylons.

Furthermore, such polymers may be employed as a blend system containing other polymers. Preferred polymer blends are those comprising vinyl ester homo- or copolymers, (meth)acrylate homo- or copolymers, and-/or substituted or unsubstituted polyalkenes or alkene copolymers. Blend polymers of interest are those which are preferably compatible, either alone or in association with compatibilizing agents, with the aforedescribed polymers and which do not render the compositions unsuitable for the purpose for which they are intended. Such blends may include blends of two or more of the aforedescribed polymers and which do not render the compositions unsuitable for the purpose for which they are intended. Such blends may include blends of two or more of the aforedescribed polymers or blends with other polymers including thermoplastic and elastomeric polymers, examples of which are polyesters and polyethers including segmented polyether ester copolymers of the type available from DuPont under the trade name Hytrel and described in Polymer Engineering and Science 14 volume 12, 848-852 1974 "Segmented Polyether Ester copolymers—a new generation of high performance elastomers", silicone resins and elastomers and acrylic elastomers. Some preferred polymer blends are described and claimed in UK Patent No. 1,284,082 and in German Offenlegenschrift No. 2815520 the disclosures of which are incorporated herein by reference.

In the case of vinyl ester or (meth)acrylate polymers, when blends are employed such polymers are preferably present in the blend in at least 20 weight per cent, e.g. 30-99 weight per cent, more preferably at least 40 weight per cent, e.g. 50-99 weight per cent.

The polymer composition may also contain other additives such as organic halogen containing or inorganic flame retardants, or organo-phosphorous compounds, anti-tracking agents, high voltage erosion suppressants, stabilizers, e.g. antioxidants and ultra-violet stabilizers, fillers, pigments, colourants and the like. In general it is preferred that the composition contain little or no halogen e.g. less than 15 weight per cent based on the composition, more preferably less than 10 weight per cent, especially less than 5 weight per cent of halogen atoms.

For most purposes, it is preferred that the compositions of the invention are substantially cross-linked.

The degree of cross-linking of the compositions may be expressed in terms of the gel content (ANSI/ASTM D2765-68) of the cross-linked polymeric composition, i.e. excluding non-polymeric additives that may be present. Preferably the gel content of the cross-linked composition is at least 10% more preferably at least 20%, e.g. at least 30%, more preferably at least 40%.

The compositions of the invention are produced in conventional manner, for example, by blending together the components of the composition in a Banbury mixer.

They may then be processed into shaped articles, for example, by extrusion or molding, and when desired simultaneously or subsequently cross-linked. Shaped articles so produced also form part of the present invention.

When desired the polymeric components of the composition may be cross-linked either by the incorporation of a crosslinking agent or by exposure to high energy radiation. Examples of suitable cross-linking agents are free radical initiators such as peroxides for example, dicumyl peroxide, 2,5-bis-(t-buty peroxy)-2,5-dimethyl-hexane, 2,5-bis-(t-butyl-peroxy)-2, 5-dimethyl-hexyne-3, and a,a-bis(t-butyl-peroxy)-di-iso propylbenzene. Other examples of appropriate cross-linking agents are disclosed in C. S. Sheppard & V. R. Kamath Polymer Engineering & Science 19 no. 9 597–606, 1979 "The Selection and Use of Free Radical Initiators" the disclosures of which is incorporated herein by reference. In a typical chemically cross-linked composition there will be about 0.5 to 5 weight per cent of peroxide based on the weight of the polymeric composition. The cross-linking agent may be employed alone or in association with a cocuring agent such as a poly-functional vinyl or allyl compound, e.g. triallyl cyanurate, triallyl isocyanurate or pentaerythritol tetra methacrylate.

Radiation cross-linking may be effected by exposure to high energy irradiation such as an electron beam or x-rays. Radiation dosages in the range 2 to 80 Mrads, preferably 2 to 50 Mrads, e.g. 2 to 20 Mrads and particuarly 4 to 15 Mrads are in general appropriate.

For the purposes of promoting cross-linking during irradiation preferably from 0.2 to 5 weight per cent of a prorad such as poly-functional vinyl or allyl compound, for example, triallyl cyanurate, triallyl isocyanurate or pentaerythritol tetramethacrylate are incorporated into the composition prior to irradiation.

The compositions of the invention are particularly suitable for electrical insulation use, e.g. where flammability requirements are stringent or high voltage anti-tracking properties are desired and water absorption highly undesirable, for example, wire and cable applications in confined areas such as aircraft, ships, mines or railways including metro systems, or termination and splicing of high voltage cables or as insulation in non-tracking high voltage applications, e.g. insulators, bushings and bus bar systems.

The production of electrical insulation material may be achieved by conventional techniques, for example, by extrusion of the non-cross-linked composition, as an insulator, onto the electrical equipment such as a copper conductor as a primary insulation, or a bundle of primary insulated copper wires as a cable jacket and preferably, simultaneously or subsequently cross-linking the applied insulation.

As aforedescribed, the compositions of the present invention are also particularly suitable in cross-linked form for the production of dimensionally recoverable articles, that is to say, articles the dimensional configuration of which may be made substantially to change when subjected to an appropriate treatment. Of particular interest are heat-recoverable articlads, the dimensional configuration of which may be made substantially to change when subjected to an appropriate treatment. Of particular interest are heat-recoverable articles, the dimensional configuration of which may be made substantially to change when subjected to heat treatment. Heat-recoverable articles may be produced by deforming a dimensionally heat-stable configuration of the article to a dimensionally heat-unstable configuration, the article assuming or tending to assume the heat-stable configuration thereof on the application of heat alone. As is made clear in U.S. Pat. No. 2,027,962, however, the original dimensionally heat-stable configuration may be a transient form in a continuous process in which, for example, an extruded tube is expanded, whilst hot, to a dimensionally heat-unstable form.

Alternatively a preformed dimensionally heat-stable article may be deformed to a dimensionally heat-unstable form in a separate stage. In the production of dimensionally recoverable articles, the composition may be crosslinked at any stage in the production process that will accomplish the desired dimensional recoverability. One manner of producing a heat-recoverable article comprises shaping the pre-cross-linked composition into the desired heat-stable form, subsequently cross-linking the composition, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape sleeves for covering and/or sealing splices and terminations in electrical conductors, for environmentally sealing damaged regions or joints in utility supply systems, e.g. gas or water pipes, district heating systems, ventilation and heating ducts and conduits or pipes carrying domestic or industrial effluent.

Adhesives and sealants in accordance with the fourth aspect of the invention are particuarly those which find use in electrical applications for example in harnessing systems, and especially in high voltage applications wherein anti-tracking fillers such as hydrated alumina are employed.

Preferred sealants include elastomer/tackifier formulations such as butyl rubber/polyisobutylene or epichlorophydrin rubber/polyketone resin compositions. Preferred adhesives include epoxy, especially cyclo aliphatic epoxy and silicone based adhesives.

Paneling and cladding materials in accordance with the fifth aspect of the invention include materials such as those disclosed and claimed in UK Patent Applications Nos. 2035333A and 2044777A the disclosures of which are incorporated herein by reference, as well as epoxy moulding compositions and unsaturated polyesters particularly when glass-fibre reinforced. Such materials may be processed into final shape by thermoforming, e.g. by vacuum forming, moulding or laying-up techniques.

The invention is illustrated by the accompanying examples wherein parts and percentages are by weight and temperatures are expressed in ° C.

EXAMPLE 1

The compositions set out in Table 1 below were compounded on a 2 roll laboratory mill heated to a temperature of 120°–140°, and molded at 170° into test plaques of 2 mm thickness. Each composition incorporated 40% (compositions L and M) or 60% (compositions A to K) commercial fire retardant grade $Al_2O_3.H_2O$ which had been pre-coated with the reagents disclosed in Table 1 and the indicated amount of commercial grade $Sb_2O_5.H_2O$. The test plaques were then irradiated with a 5.8 MeV electron beam to a total dosage of 12 Mrads.

The composition of each formulation employed is set out in Table 1 below which shows the number of parts of each constituent.

TABLE 1

| COMPO-SITION | POLYMER | FILLER COATING (Wt % of filler) | $Sb_2O_5.H_2O$ (Wt % of filler) |
|---|---|---|---|
| A | 60 vinyl acetate/40% ethylene copolymer | 5% acrylic acid | 5% |
| B | 60 vinyl acetate/40% ethylene copolymer | 5% acrylic acid | 10% |
| C | 60 vinyl acetate/40% ethylene copolymer | 1.3% oleic acid | 5% |
| D | 60 vinyl acetate/40% ethylene copolymer | 2% stearic acid | 5% |
| E | 60 vinyl acetate/40% ethylene copolymer | 6.6% of filler coated with 2% of stearic acid and balance coated with 3% of acrylic acid | 10% |
| F | 60 vinyl acetate/40% ethylene copolymer | 10% stearic anhydride | 2% |
| G | 60 vinyl acetate/40% ethylene copolymer | 5% citric acid | 2% |
| H | VAMAC N-123 (Trade Name-elastomeric copolymer of ethylene and methyl acrylate containing monoalkyl ester cure sites commercially available from DuPont | 5% silane (commercially available under TM A172 from Union Carbide) | 5% |
| I | VAMAC N-123 (Trade Name-elastomeric copolymer of ethylene and methyl acrylate containing monoalkyl ester cure sites commercially available from DuPont | 5% silane (A172) | 10% |
| J | HYTREL 4056 (Trade Name- | 5% titanate | 5% |

TABLE 1-continued

| COMPO-SITION | POLYMER | FILLER COATING (Wt % of filler) | $Sb_2O_5.H_2O$ (Wt % of filler) |
|---|---|---|---|
| K | Thermoplastic copolyester commercially availabe from DuPont) HYTREL 4056 (Trade Name-Thermoplastic copolyester commercially availabe from DuPont) | (available under ™ TTS from Kenrich Petrochem) 5% titanate (TTS) | 10% |
| L | SCLAIR 8105 (Trade Name-Linear low density poly-ethylene commercially available from DuPont) | 5% acrylic acid | 5% |
| M | SCLAIR 8105 (Trade Name-Linear low density poly-ethylene commercially available from DuPont) | 5% acrylic acid | 10% |

The results are set out in Table II below. For comparison purposes, the results for control samples incorporating no $Sb_2O_5.H_2O$ and 60% uncoated $Al_2O_3.3H_2O$ are given.

TABLE

| COMPO-SITION | % WATER UPTAKE | | | PERMITTIVITY | | | TENSILE STRENGTH @ 23° (MPa) | ELON-GATION @ 23° (%) | LOI @ 23° (%) |
|---|---|---|---|---|---|---|---|---|---|
| | 24 hours | 168 hours | 336 hours | 0 hours | 24 hours | 336 hours | | | |
| A | 3.05 | 4.63 | 5.31 | 3.31 | 4.30 | 7.15 | 14.59 | 144 | 29.0 |
| B | 2.24 | 3.42 | 4.93 | 4.46 | 5.71 | 7.71 | 16.22 | 146 | 28.6 |
| C | 4.1 | 3.4 | — | — | — | — | 5.4 | 468 | — |
| D | 1.0 | 0.9 | — | — | — | — | 4.4 | 448 | — |
| E | 0.5 | 0.6 | — | 4.54 | 4.45 | 4.51 | — | — | 42.0 |
| F | 1.0 | 1.8 | — | 4.15 | 4.79 | 5.47 | — | — | 32.0 |
| G | 3.4 | 0.87 | — | — | — | — | — | — | 48.0 |
| CONTROL | 7.44 | 7.44 | 6.13 | 4.04 | 55.67 | 20.85 | 4.96 | 288 | 44.7 |
| H | 1.31 | 3.06 | 3.64 | 5.03 | 8.04 | 8.20 | 10.91 | 82 | 42.7 |
| I | 1.00 | 1.89 | 2.09 | 4.69 | 6.28 | 7.29 | 11.88 | 108 | 33.9 |
| CONTROL | 2.86 | 6.94 | 8.03 | 3.38 | 11.14 | 15.99 | 9.37 | 313 | 43.0 |
| J | 1.07 | 1.01 | 1.12 | 4.16 | 6.84 | 7.23 | 19.94 | 26 | 35.4 |
| K | 0.81 | 0.61 | 0.58 | 4.55 | 5.34 | 6.68 | 11.96 | 21 | 30.2 |
| CONTROL | 2.70 | 1.47 | 1.47 | 4.34 | 23.26 | 32.34 | 16.89 | 21 | 43.5 |
| L | 0.20 | 0.68 | 0.08 | 2.44 | 2.17 | 3.05 | 15.86 | 221 | 19.5 |
| M | 0.25 | 0.64 | 0.69 | 2.63 | 2.38 | 2.75 | 15.13 | 184 | 19.5 |
| CONTROL | 0.65 | 1.60 | 1.35 | 2.44 | 14.44 | 28.57 | 14.66 | 42 | 22.5 |

The samples so produced were subjected to the following test methods.

TEST METHODS (i) Water Uptake
3 test discs 2.5 cm in diameter were employed to determine water uptake by immersion in water at 90° (compositions C to G) or 50° (remaining compositions) for various periods. At the end of each period, the discs were removed, excess water wiped off the discs weight and the percentage weight increase computed.

(ii) Permittivity after immersion in water at 50° in accordance with BS2782, Method 206B.

(iii) Tensile strength and elongation
In accordance with ISO37 employing a strain rate of 10 cm/minute and type 2 dumbells.

(iv) Flammability
In accordance with the limiting Oxygen Index (LOI) method of ASTM-D-2863.

EXAMPLE 2

Test plaques were made up in analogous manner to that described in Example 1 and subjected to water immersion at 90° C. for 7 days. Permittivity (per BS2782, method 206B) and electric strength (per BS2782, method 201C) before and after immersion were measured. The composition of the formulations tested are as set out in Table III and the results are set out in Table IV.

Compositions N and P were also extruded as 1 inch tubing, irradiated and expanded to produce heat-shrinkable articles useful respectively for the termination of high voltage power cables and for bus bar coverings.

TABLE III

| CONSTITUENT | FORMULATION PARTS | | | |
|---|---|---|---|---|
| | N | O(CONTROL) | P | Q(CONTROL) |
| DYNH-3 (™-low density poly-ethylene available from Union Carbide) | 22.90 | 22.90 | 34.42 | 34.42 |
| Ethylene/ethyl acrylate (18%) copolymer | 22.89 | 22.89 | — | — |
| Polydimethylsiloxane elastomer | 22.89 | 22.89 | — | — |
| Royalene-611 (™-EPDB rubber available from Uniroyal) | — | — | 34.42 | 34.42 |

TABLE III-continued

| CONSTITUENT | FORMULATION PARTS | | | |
|---|---|---|---|---|
| | N | O(CONTROL) | P | Q(CONTROL) |
| $Fe_2O_3$ | 3.81 | 3.81 | 0.86 | 0.86 |
| Agerite-D (TM-antioxidant available from. Vanderbilt) | 1.52 | 1.52 | 0.69 | 0.69 |
| Triallyl cyanurate | 0.77 | 0.77 | — | — |
| Trimethylolpropane trimethacrylate | — | — | 0.69 | 0.69 |
| Aerosil 200 (TM-silica available from Degussa) | — | — | 1.38 | 1.38 |
| $Al_2O_3.3H_2O$ | — | 25.18 | — | 27.54 |
| $Al_2O_3 3H_2O$ precoated with 1% thereof acrylic acid | 24.42 | — | 26.71 | — |
| $Sb_2O_5.H_2O$ | 0.76 | 0.83 | — | — |

TABLE IV

| FORMULATION | Permittivity | | Electric Strength (KV/cm) | |
|---|---|---|---|---|
| | Before | After | Before | After |
| N | 2.6 | 5.5 | 198.1 | 93.2 |
| O | 2.7 | 9.6 | 187.1 | 66.9 |
| P | 2.4 | 3.1 | 177.9 | 144.9 |
| Q(CONTROL) | 2.5 | 3.8 | 201.4 | 99.6 |

EXAMPLE 3

The compositions set out in Table V below (which shows the number of parts of each constituent) were compounded on a 2 roll laboratory mill heated to a temperature of 120°–140°, and moulded at 190° into test plaques of 2 mm thickness. The test plaques were then irradiated on a 5.8 MeV electron beam to a total dosage of 12 Mrads. 3 test discs 2.5 cm in diameter were cut out of each plaque and the discs were employed to determine water pick-up by immersion in water at 90° for various periods. At the end of each period, the discs were removed, excess water wiped off and the discs weighed. The results are listed in Table VI below each result reported being the average result for three identical discs.

TABLE V

| CONSTITUENTS | FORMULATIONS | | | | | | | | | | |
|---|---|---|---|---|---|---|---|---|---|---|---|
| | A | B | C | D | E | F | G | H | I | J | K |
| 60% vinyl acetate/ethylene copolymer | 40 | 40 | 40 | 40 | 40 | 40 | — | — | 40 | — | — |
| 25% vinyl acetate/ethylene copolymer | — | — | — | — | — | — | 40 | — | — | 40 | — |
| ethylene/ethyl acrylate 18% copolymer | — | — | — | — | — | — | — | 40 | — | — | 40 |
| $Al_2O_3.3H_2O$ | — | — | — | — | — | 60 | 60 | 60 | 57 | 57 | 57 |
| $Al_2O_3.3H_2O$ coated with 1.5% vinyl trimethoxyethoxy-silane | 60 | 60 | 60 | 60 | 60 | — | — | — | — | — | — |
| $Sb_2O_5.H_2O$ | — | 3 | 12 | — | — | — | — | — | 3 | 3 | 3 |
| $Sb_2O_3$ | — | — | — | 3 | 12 | — | — | — | — | — | — |

The water immersion results are set out in Table VI below.

TABLE VI

| FORMULATION | % WEIGHT INCREASE AFTER IMMERSION AT 90° IN WATER | | | | |
|---|---|---|---|---|---|
| | 24 hrs | 48 hrs | 168 hrs | 336 hrs | 672 hrs |
| A | 5.2 | 5.7 | — | — | 9.3 |
| B | 3.3 | 3.5 | — | — | 1.9 |
| C | 1.0 | 1.0 | — | — | 0.65 |
| D | 4.7 | 5.5 | — | — | 8.2 |
| E | 4.9 | 5.7 | — | — | 8.3 |
| F | 20.3 | 20.6 | 14.2 | 14.1 | — |
| G | 9.0 | 12.9 | 24.8 | 28 | — |
| H | 7.1 | 10.3 | 19.5 | 31 | — |
| I | 7.1 | 5.8 | 3.4 | 3.3 | — |
| J | 5.3 | 7.5 | 6.3 | 5.1 | — |
| K | 5.9 | 7.8 | 10.6 | 11.0 | — |

The results clearly demonstrate a substantial reduction in the tendency of alumina trihydrate filled vinyl acetate/ethylene copolymer (formulations A, F and G) and ethylene/ethyl acrylate systems (formulation H) to absorb water by the incorporation of $Sb_2O_5.H_2O$ (formulations B, C, I, J and K) and the lack of such effect by the incorporation of $Sb_2O_3$ (formulations D and E).

EXAMPLE 4

In analogous manner to that described in Example 3, compositions comprising 25 parts of a 50% vinyl acetate/vinyl laurate copolymer, 5 parts of a linear low density polyethylene (Sclair 11D1-Trade Name-Ex DuPont) and 70 parts of alumina trihydrate coated with 1.5% vinyl trimethoxyethoxy-silane were compound with varying amounts of $Sb_2O_5.H_2O$. The percentage of $Sb_2O_5.H_2O$ in the formulations were as set out in Table VII below.

TABLE VII

| Formulation | % $Sb_2O_5.H_2O$ |
|---|---|
| A | 0 |
| B | 0.17 |
| C | 0.5 |
| D | 1.0 |
| E | 3.0 |
| F | 5.0 |

The water absorption of samples of such materials was determined in accordance with the procedure described in Example 3. Oil uptake employing identical samples as employed for water absorption was determined in accordance with ASTM-D-570-77 carried out at 100° employing mineral oil (ASTM No. 2) and synthetic lubricating oil (British Spec. D. Eng. R.D. 2487 "OX-38") and limiting oxygen index at 23°, determined in accordance with ASTM-D-2863, and at 250° C. in accordance with British Ministry of Defence method NES 715.

The results are set out below in Table VIII and indicate that a substantial decrease in water absorption by the incorporation of small amounts of $Sb_2O_5.H_2O$ is not accompanied by a significant change in oil uptake at 100° C. The results also show that at low levels $Sb_2O_5.H_2O$ gives no significant improvement in flame retardance at 23° C.

TABLE VIII

| Form- | % water uptake | | % oil uptake at 100° | | Oxygen Index % | |
|---|---|---|---|---|---|---|
| ulation | 24 hrs | 48 hrs | ASTM 2 | OX 38 | at 23° | at 250° |
| A | 5.2 | 6.7 | 7.5 | 22.9 | 49.5 | 35.5 |
| B | 5.0 | 6.1 | 9.3 | 24.5 | 42.5 | — |
| C | 4.5 | 5.4 | 9.3 | 26.7 | 43.5 | — |
| D | 2.8 | 3.4 | 8.7 | 22.1 | 46.0 | 37.5 |
| E | 1.8 | 1.8 | 9.8 | 23.6 | 51.5 | — |
| F | 0.9 | 0.9 | 8.8 | 22.6 | 48.5 | 39.5 |

EXAMPLE 5

In analogous manner to that described in Example 3, compositions were prepared comprising the formulations set out in Table IX below which shows the number of parts of each constituent. YES in Table IX indicates that the alumina trihydrate has been treated, before compounding, in the manner described below.

TABLE IX

| CONSTITUTENTS | EXAMPLE No. | | | | | | | | | | | |
|---|---|---|---|---|---|---|---|---|---|---|---|---|
| | A | B | C | D | E | F | G | H | I | J | K | L |
| Ethylene/18% ethyl acrylate copolymer | 40 | 40 | 40 | 40 | 40 | 40 | | | | | | |
| 60% vinyl acetate/ ethylene copolymer | | | | | | | 40 | 40 | 40 | 40 | 40 | 40 |
| $Al_2O_3.3H_2O$. | 60 | 60 | 60 | | | | 60 | 60 | 60 | | | |
| $Al_2O_3.3H_2O$ coated with 1.5% vinyl trimethoxyethoxy silane | | | | 60 | 60 | 60 | | | | 60 | 60 | 60 |
| Glacial acetic acid treatment of filler | | YES | YES | | YES | YES | | YES | YES | | YES | YES |
| $Sb_2O_5.H_2O$ treatment of coated filler | | | YES | | | YES | | | YES | | | YES |

In examples B, E, H and K, the alumina trihydrate filler was treated by violently agitating 200 g thereof whilst adding 5 ml of glacial acetic acid as a fine spray over a period of 5 minutes before compounding.

In examples C, F, I and L, the alumina trihydrate filler was treated by violently agitating 200 g thereof whilst adding 5 ml of glacial acetic acid as a fine spray over a period of 5 minutes and then dry-blending with 10.5 g of $Sb_2O_5.H_2O$ for 5 minutes. The mixture was then placed in a vacuum oven at 140° overnight. It is postulated that this treatment results in the partial esterification of the hydroxyl groups of surface alumina trihydrate molecules of the particulate $Sb_2O_5.H_2O$ effectively to form a surface complex-containing coating on the filler particles. The alumina trihydrate so treated is compounded as described above.

In examples D, E, F, J, K and L the alumina trihydrate employed before acid treatment is a commercially available form containing a partial surface coating (1.5%) of the silane coupling agent vinyl trimethoxyethoxysilane. Examples 1 to 6 are based on 40 parts of ethylene/ethyl acrylate copolymer (containing 18% ethyl acrylate) and 60 parts of inorganic filler.

Examples G and L are based on 40 parts of a vinyl acetate/ethylene copolymer containing 60 weight per cent vinyl acetate, and 60 parts of inorganic filler.

TABLE X

| | % Weight Uptake After Immersion In Water At 90° C. For | |
|---|---|---|
| Example | 24 Hours | 7 Days |
| A | 7.1 | 19.5 |
| B | 7.7 | 18.3 |
| C | 4.5 | 9.8 |
| D | 2.0 | 4.3 |
| E | 4.8 | 6.5 |
| F | 1.3 | 2.5 |
| G | 20.3 | 14.2 |
| H | 21.9 | 21.3 |
| I | 5.6 | 3.5 |
| J | 5.8 | 10.4 |
| K | 5.2 | 9.4 |
| L | 1.2 | 0.9 |

The results shown in Table X demonstrate a dramatic decrease in water uptake in Examples C, F, I, and L produced by the antimony (V) complex coating, when compared to analogous systems in the absence of a complex coating.

EXAMPLE 6

Compositions exposed to an extended processing time on a 2 roll laboratory mill have also been prepared. Test plaques were made up in analogous manner to that described in Example 1, except the normal compounding times on the mill were extended by (i) 10 minutes, (ii) 30 minutes and (iii) 60 minutes. The composition comprised 40 parts by weight of a 60% vinyl acetate/40% ethylene copolymer, 54 parts by weight untreated alumina trihydrate and 6 parts by weight antimony pentoxide monohydrate.

The samples so produced were subjected to water uptake and permittivity tests as detailed in the test methods of Example 1. The results are shown in Table XI below.

TABLE XI

| | | Weight increase after immersion in $H_2O$ @ 90° C. | | | Permittivity after immersion in $H_2O$ @ 50° C. | | |
|---|---|---|---|---|---|---|---|
| | | 24 h | 48 h | 168 h | 0 h | 24 h | 168 h |
| 1 | Normal milling | 7.4 | 6.2 | 3.1 | 4.06 | 22 | 32 |
| 2 | 1 + 10 minutes | 1.30 | 1.27 | 1.21 | 5.41 | 9.80 | 12 |
| 3 | 1 + 30 minutes | 1.24 | 1.60 | 1.04 | 5.34 | 11.20 | 15 |
| 4 | 1 + 60 minutes | 1.33 | 1.82 | 1.01 | 4.99 | 8.51 | 13 |

From Table XI it can be clearly seen that an extended milling time can be of substantial benefit, especially with respect to water uptake. In commercial production this benefit can be achieved by optimizing residence times in processing equipment such as extruders or Banbury mixers.

EXAMPLE 7

700 gms. of high surface area (13 m²/g) alumina trihydrate were dispersed in 7 liters of:
(i) Triply distilled water.
(ii) Triply distilled water to which 35 grams of acrylic acid had been added.
(iii) Triply distilled water to which 35 grams of zinc uranyl acetate had been added.

and vigorously agitated for 3 hours at 80°-85° C. The washed ALTH was recovered by filtration and washed dried under vacuum and ball milled. This yielded material with physical properties (e.g. T.G.A. curve surface area etc.) similar to those of the starting material. The recovered ALTH was (a) compounded with 40% by weight of a 60% vinyl acetate/40% ethylene copolymer as described in Example 1, (c) coated with 5% acrylic acid and 10% antimony pentoxide monohydrate before compounding with 40% by weight of a 60% vinyl acetate/40% ethylene copolymer or (b) coated only with 10% antimony pentoxide before compounding with 40% by weight 60% vinyl acetate/40% ethylene copolymer. Table XII shows that the benefits of the invention are observed even when using ALTH which has been treated to remove soluble sodium impurity.

TABLE XII

|  | Weight Uptake After Immersion in $H_2O$ at 90° C. | | | Permittivity Values After Immersion at 50° C. | | | |
|---|---|---|---|---|---|---|---|
|  | 24 th | 48 h | 168 h | 0 h | 24 h | 168 h | 336 h |
| (i) Washed ALTH | | | | | | | |
| (a) uncoated | 2.94 | 3.42 | 5.17 | 4.74 | 7.64 | 8.39 | 8.35 |
| (b) coated with $Sb_2O_5 \cdot H_2O$ (10%) | 1.01 | 0.97 | 0.97 | 4.84 | 5.81 | 6.16 | 5.64 |
| (c) b + 5% acrylic acid coating | 1.03 | 1.14 | 1.28 | 4.38 | 4.42 | 4.61 | 4.84 |
| (ii) Acrylic acid washed ALTH | | | | | | | |
| (a) uncoated | 4.36 | 5.56 | 8.04 | 5.14 | 6.96 | 7.62 | 8.37 |
| (b) coated with $Sb_2O_5 \cdot H_2O$ (10%) | 1.02 | 0.99 | 1.03 | 5.10 | 7.04 | 7.36 | 6.95 |
| (iii) Zinc uranyl acetate washed ALTH | | | | | | | |
| (a) uncoated | 7.22 | 10.98 | 9.77 | 3.87 | 9.05 | 11.35 | 14.62 |
| (b) coated with $Sb_2O_5 \cdot H_2O$ (10%) | 1.11 | 1.13 | 1.11 | 5.12 | 7.81 | 8.96 | 9.65 |
| (c) b + 5% acrylic acid coating | 0.53 | 0.48 | 0.35 | 4.04 | 4.94 | 4.99 | 5.17 |

EXAMPLE 8

Benefits in reduced water uptake and maintained low permittivity can also be obtained with alumina monohydrate (ALMH). Samples based on a 25% vinyl acetate/75% ethylene copolymer and aluminum oxyhydroxide (Boehmite A10.OH) were prepared in an identical manner to that described in Example 1. The weight ratio of ALMH to the 25% vinyl acetate/75% ethylene copolymer was 3:2, and the coating level of the antimony pentoxide monohydrate was 10% wt on the ALMH. The results are shown in Table XIII below and illustrate the improvement in water uptake and permittivity that is achieved by coating ALMH by antimony pentoxide monohydrate.

TABLE XIII

|  | Weight uptake after immersion in $H_2O$ at 90° C. | | | Permittivity after immersion $H_2O$ at 50° C. | | |
|---|---|---|---|---|---|---|
|  | 24 th | 48 h | 168 h | 0 h | 24 th | 168 h |
| Uncoated sample | 1.24 | 1.61 | 2.43 | 4.23 | 8.23 | 10.37 |
| $Sb_2O_5 \cdot H_2O$ coated sample | 0.58 | 0.79 | 0.93 | 3.49 | 7.63 | 6.87 |

EXAMPLE 9

The following formulation was compounded and extruded as a primary wire insulation and as a cable jacket viz.

|  | % |
|---|---|
| 60% vinyl acetate/40% ethylene copolymer | 16.50 |
| Masterbatch (see below) | 16.00 |
| Dibasic lead fumarate | 0.50 |
| Agerite Resin D | 0.60 |
| Carbon Black | 0.50 |
| $Al_2O_3 \cdot 3H_2O$ coated with 1.5% thereof of A-172 silane | 54.90 |
| $Sb_2O_5 \cdot H_2O$ | 11.00 |

The composition of the aforementioned masterbatch was as follows:

|  | % |
|---|---|
| Hytrel 4056 ( ™ -segmented polyester available from DuPont | 85.16 |
| Hytrel 10 MS ( ™ -segmented polyester available from DuPont) | 9.46 |
| HTR 3139 ( ™ -stabilizer available from DuPont) | 4.26 |
| Anchor DNPD ( ™ -stabilizer available from Anchor Chemicals) | 1.11 |

The cable jacket was extruded over a 19 component braided cable to yield a wall thickness of 1 mm employing a 3 inch extruder, an L/D ratio of 24:1 the extruder having a 5 zone temperature control with zone temperatures, from feed to die of 110°-130°-140°-140°-140° C., a die body temperature of 140° and die tip temperature of 150°.

The primary insulation was extruded onto a 16 AWG tinned copper conductor to yield a wall thickness of 1 mm employing a 1 inch extruder, an L/D ratio of 24:1, the extruder having a 4 zone temperature control with zone temperatures from feed to die of 140°-180°-185°-190°, a die body temperature of 190° and a die tip temperature of 190°.

The resulting cable jacket and primary wire insulation were subjected to electron beam irradiation under a 1.5 MeV electron accelerator to a total dosage of 6 Mrads.

The resulting jacket and primary wire insulation material exhibited an LOI at 23° C. of 48 and a capacitance change after immersion in water at 50° C. of 8% (1 to 14 days) and 6.2% (7 to 14 days) (per BS2782 method 206B).

EXAMPLE 10

In analogous manner to that described in Example 3, composition were prepared comprising the formulations set out in Table XIV below which shows the number of parts of each constituent.

In Example A a similar treatment of the alumina trihydrate was adopted as for examples C, F, I and L in Example 5; except 5 ml of acetylacetone were employed instead of glacial acetic acid. In Example B the antimony pentoxide monohydrate was omitted.

TABLE XIV

| CONSTITUENTS | A | B |
| --- | --- | --- |
| 60% vinyl acetate/ethylene copolymer | 40 | 40 |
| $Al_2O_3.3H_2O$ | 60 | 60 |
| $Sb_2O_5.H_2O$ treatment of coated filler | YES | |
| Acetylacetone treatment of filler | YES | YES |
| % Weight uptake after immersion in water at 90° C. for | | |
| (i) 24 hours | 1.9 | 14.5 |
| (ii) 7 days | 2.3 | 10.7 |

What is claimed:

1. A water stabilized polymeric composition suitable for use as electrical insulation comprising (a) a polymer, (b) 5 to 80%, based on the weight of the composition, of a hydrated alumina filler, and (c) a sodium-reactive antimony V compound in an amount effective to improve the water stability of the compositon, the composition having less than 15% by weight halogen content.

2. A composition according to claim 1, in which the hydrated alumina is alumina trihydrate $Al_2O_3.3H_2O$.

3. A composition according to claim 1, in which the hydrated alumina has a surface area of from 2 to 40 $M^2/g$ as measured by the B.E.T. method.

4. A composition according to claim 1, in which the hydrated alumina is present in an amount of from 20 to 70% based on the weight of the composition.

5. A composition according to claim 1, in which the antimony V compound is a hydrated antimony V oxide or a precursor thereof.

6. A composition according to claim 1, in which the antimony V compound is present in an amount of from 0.1 to 10 weight per cent, based on the weight of the composition.

7. A composition according to claim 1, in which the antimony V compound is present in an amount of from 10 to 25 weight per cent, based on the weight of the composition.

8. A composition according to claim 1, in which the hydrated alumina has been treated with a silane or titanate coupling agent.

9. A composition according to claim 1, in which the hydrated alumina has been pre-treated to reduce the level of sodium impurity therein.

10. A composition according to claim 9, in which the hydrated alumina has been pre-treated by washing with water or an aqueous medium to reduce the total sodium level therein to less than 1000 ppm measured as $Na_2O$, based on the weight of the hydrated alumina.

11. A composition according to claim 9, in which the hydrated alumina has been pre-treated with a sodium complexing or chelating agent and washed to remove water soluble compounds thus formed.

12. A composition according to claim 11, in which the sodium complexing or chelating agent is zinc uranyl acetate.

13. A composition according to claim 1, which comprises a vinyl ester homo—or copolymer or a (meth)acrylate homo—or copolymer.

14. A composition according to claim 1, which comprises a polymer blend comprising a vinyl ester homo—or copolymer, a (meth)acrylate homo—or copolymer, a substituted or unsubstituted polyalkene or alkene copolymer, a segmented polyether ester copolymer, a silicone resin or elastomer, or an acrylic elastomer.

15. A composition according to claim 14, which comprises a vinyl ester homo—or copolymer or (meth)acrylate homo— or copolymer, and wherein the vinyl ester homo-or copolymer is present in an amount of from 30 to 99 weight percent based on the total weight of polymers present.

16. A water stabilized dimensionally recoverable article comprising a polymeric composition according to claim 1.

17. Electrical equipment incorporating as electrical insulation a polymeric composition according to claim 1.

18. A water stablized polymeric composition according to claim 1, wherein at least one of (b) or (c) is coated with a reagent which can chemically react with or physically bond to the surface of the other component.

19. A composition according to claim 18, wherein the reagent is an acid, a reactive functional acid derivative, or a complex chelating agent.

20. A composition according to claim 18, in which the hydrated alumina is alumina trihydrate $Al_2O_3.3H_2O$.

21. A composition according to claim 18, in which the antimony V compound is a hydrated antimony V oxide or a precursor thereof.

22. A composition according to claim 18, in which the antimony V compound is present in an amount of from 0.1 to 10 weight per cent, based on the weight of the composition.

23. A composition according to claim 18, in which the antimony V compound is present in an amount of from 10 to 25 weight per cent, based on the weight of the composition.

24. A composition according to claim 19, in which the acid is acrylic acid or citric acid.

25. A composition according to claim 19, in which the complexing or chelating agent is a polydentate ligand.

26. A composition according to claim 25, in which the polydentate ligand is a B-polyketonate or an imine derivative thereof.

27. A composition according to claim 18, in which the amount or reagent(s) employed is from 1 to 10 weight per cent based on the weight of the hydrated alumina.

28. A composition according to claim 18, in which the hydrated alumina has been pre-treated to reduce the total sodium level therein to less than 1000 ppm measured as Na$_2$O, based on the weight of the hydrated alumina.

29. A composition according to claim 18, in which the hydrated alumina has been pre-treated with a sodium complexing or chelating agent and washed to remove water soluble compounds thus formed.

30. A composition according to claim 29, in which the sodium complexing or chelating agent is zinc uranyl acetate.

31. A composition according to claim 18, which comprises a vinyl ester homo—or copolymer or a (meth)acrylate homo—or copolymer.

32. A composition according to claim 18, which comprises a polymer blend comprising a vinyl ester homo—or copolymer, a (meth)acrylate homo—or copolymer, a substituted or unsubstituted polyalkene or alkene copolymer, a segmented polyether ester copolymer, a silicone resin or elastomer, or an acrylic elastomer.

33. A water stabilized dimensionally recoverable article comprising a polymeric composition according to claim 18.

34. Electrical equipment incorporating as electrical insulation a polymeric composition according to claim 18.

35. A composition according to claim 18, in which the hydrated alumina is present in an amount of from 5 to 80% based on the weight of the composition.

36. A composition according to claim 18, in which the antimony V compound is present in an from amount 0.1 to 60 weight per cent, based on the weight of the composition.

* * * * *